United States Patent
Ito et al.

(10) Patent No.: US 8,572,292 B2
(45) Date of Patent: *Oct. 29, 2013

(54) COMMAND INTERFACE SYSTEMS AND METHODS

(75) Inventors: Yutaka Ito, Tokyo (JP); Tadashi Yamamoto, Ibaraki (JP)

(73) Assignee: Micron Technology, Inc., Boise, ID (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/213,997

(22) Filed: Aug. 19, 2011

(65) Prior Publication Data

US 2011/0302328 A1 Dec. 8, 2011

Related U.S. Application Data

(63) Continuation of application No. 11/840,074, filed on Aug. 16, 2007, now Pat. No. 8,005,995.

(51) Int. Cl.
*G06F 3/00* (2006.01)
*G11C 7/00* (2006.01)
*G11C 8/18* (2006.01)

(52) U.S. Cl.
USPC .............................. 710/5; 365/222; 365/233.5

(58) Field of Classification Search
None
See application file for complete search history.

(56) References Cited

U.S. PATENT DOCUMENTS

| | | | |
|---|---|---|---|
| 5,469,545 A * | 11/1995 | Vanbuskirk et al. | 709/234 |
| 5,584,039 A * | 12/1996 | Johnson et al. | 710/6 |
| 5,673,233 A | 9/1997 | Wright et al. | |
| 5,717,952 A * | 2/1998 | Christiansen et al. | 710/22 |
| 5,805,501 A * | 9/1998 | Shiau et al. | 365/185.29 |
| 5,880,987 A | 3/1999 | Merritt | |
| 6,542,904 B2 * | 4/2003 | Crus et al. | 1/1 |
| 6,674,684 B1 * | 1/2004 | Shen | 365/230.03 |
| 6,697,992 B2 | 2/2004 | Ito et al. | |
| 6,735,726 B2 | 5/2004 | Muranaka et al. | |
| 6,795,362 B2 | 9/2004 | Nakai et al. | |
| 6,972,585 B2 | 12/2005 | Ito et al. | |
| 6,990,031 B2 | 1/2006 | Hashimoto et al. | |
| 6,992,942 B2 | 1/2006 | Ito | |
| 7,003,763 B2 * | 2/2006 | Sudo et al. | 717/128 |
| 7,017,027 B2 | 3/2006 | Inaba et al. | |
| 7,120,761 B2 * | 10/2006 | Matsuzaki et al. | 711/149 |
| 7,142,476 B2 | 11/2006 | Hashimoto et al. | |
| 7,176,752 B2 | 2/2007 | Hashimoto et al. | |
| 7,184,338 B2 * | 2/2007 | Nakagawa et al. | 365/201 |
| 7,184,351 B2 | 2/2007 | Ito et al. | |
| 7,284,144 B2 * | 10/2007 | Surico | 713/600 |
| 7,493,531 B2 | 2/2009 | Ito et al. | |
| 7,733,731 B2 | 6/2010 | Ito et al. | |
| 8,005,995 B2 | 8/2011 | Ito et al. | |
| 2004/0041814 A1 * | 3/2004 | Wyatt et al. | 345/556 |
| 2005/0080842 A1 * | 4/2005 | Takeuchi et al. | 709/200 |
| 2005/0212613 A1 | 9/2005 | Hashimoto | |
| 2005/0229076 A1 | 10/2005 | Riho et al. | |
| 2005/0281112 A1 | 12/2005 | Ito et al. | |
| 2005/0283704 A1 | 12/2005 | Ito et al. | |
| 2005/0286330 A1 | 12/2005 | Ito et al. | |
| 2005/0286331 A1 | 12/2005 | Ito et al. | |
| 2006/0023545 A1 | 2/2006 | Ito et al. | |
| 2009/0049455 A1 | 2/2009 | Ito et al. | |

\* cited by examiner

*Primary Examiner* — Idriss N Alrobaye
*Assistant Examiner* — Ronald Modo
(74) *Attorney, Agent, or Firm* — Schwegman, Lundberg & Woessner, P.A.

(57) ABSTRACT

Apparatus, systems, and methods are disclosed that operate within a memory to execute internal commands, to suspend the execution of commands during a transfer period, and to execute external commands following the transfer period. Additional apparatus, systems, and methods are disclosed.

20 Claims, 12 Drawing Sheets

COMMAND INTERFACE SYSTEMS AND METHODS

PRIORITY APPLICATION

This application is a continuation of U.S. application Ser. No. 11/840,074, filed Aug. 16, 2007, now U.S. Pat. No. 8,005, 995 which is incorporated herein by reference in its entirety.

BACKGROUND

Some electronic devices can operate according to external command signals or internal command signals depending on the operating mode. For example, an electronic device may operate according to internal command signals during a sleep mode, and then switch to operate according to external command signals when not in the sleep mode.

When switching modes of operation, there can be a function failure due to an unexpected command at the boundary of transfer between operations according to external command signals and operations according to internal command signals. This function failure is also called a command hazard.

DETAILED DESCRIPTION

Digital signals are shown in the Figures and will be included in the following description. A "high" digital signal has a high voltage and may also be called high, a high signal, or be referred to as being at a high level. A "low" digital signal has a low voltage and may also be called low, a low signal, or be referred to as being at a low level. In some embodiments, a high digital signal has a higher voltage level than that of the low digital signal.

Figure 1:
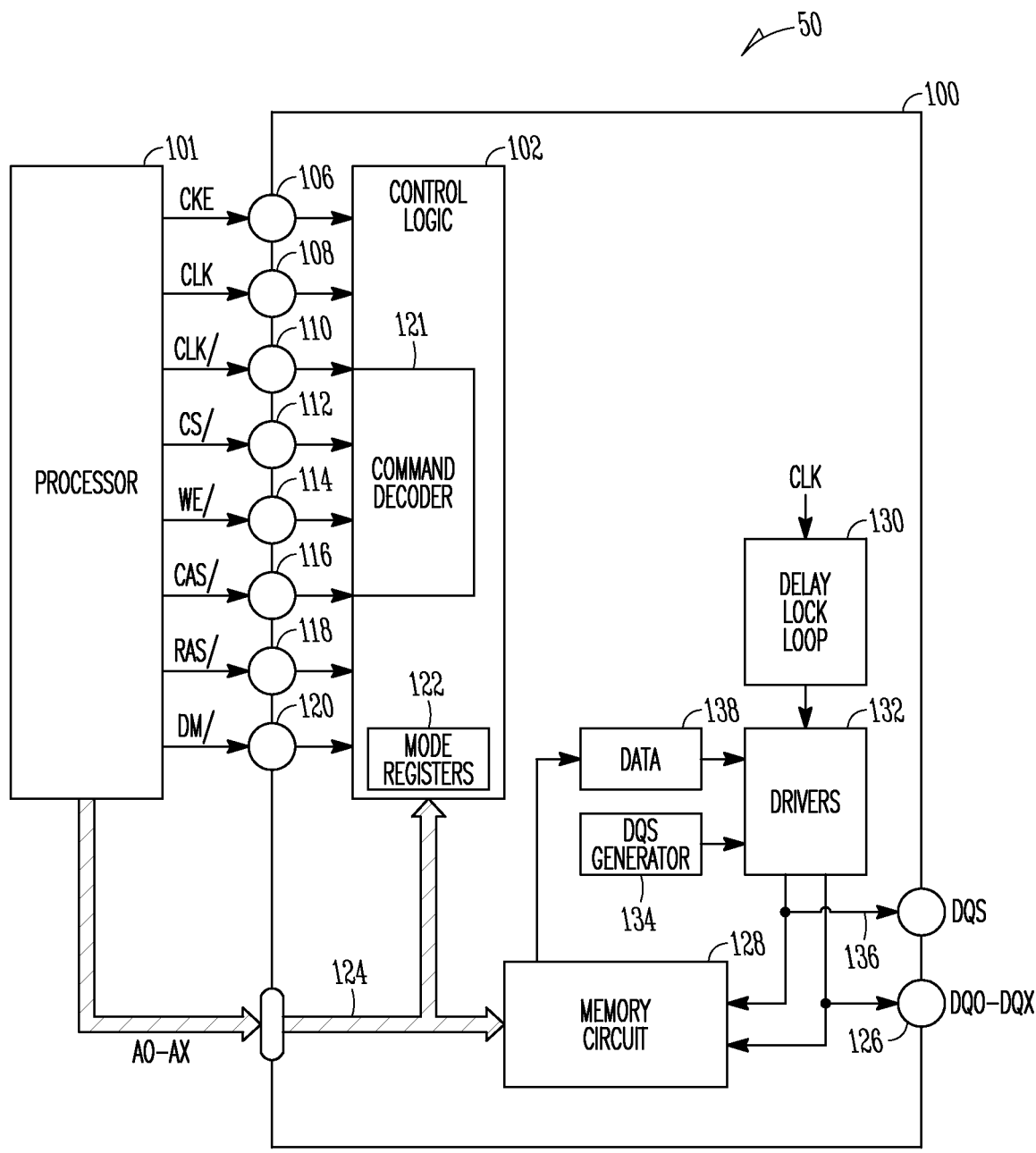
FIG. 1 is a block diagram of a system according to an embodiment of the invention.

FIG. 1 is a block diagram of a system 50 including a memory device 100 and a processor 101 according to an embodiment of the invention. The memory device 100 includes a control logic circuit 102 coupled to receive external command signals from the processor 101.

The external command signals include a clock enable signal CKE at a pin 106, a clock signal CLK at a pin 108, and a clock signal CLK/ at a pin 110. The "/" designation indicates that the signal is active low. A pin is a conductive physical device such as a wire or a metallic terminal and is a specific type of port through which an external signal is coupled to an electronic device such as the memory device 100. The active low clock signal CLK/ is the clock signal CLK inverted. The clock enable signal CKE is a signal instructing validity of the following clock signal. When the signal CKE is at the high level, the rising edge of the following clock signal CLK is valid. When the signal CKE is at the low level, the rising edge of the following clock signal CLK is invalid. The external command signals also include a chip select signal CS/ at pin 112, a write enable signal WE/ at a pin 114, a column address strobe signal CAS/ at a pin 116, a row address strobe signal RAS/ at a pin 118, and a data-mask signal DM/ at a pin 120. The external command signals at the pins 106-120 are decoded in a command decoder 121.

In addition, the memory device 100 has one or more mode registers 122 that are programmed with information for operating the memory device 100. The memory device 100 also includes an address bus 124 that receives address signals at pins A0-AX, a data bus 126 that receives and transmits data at pins DQ0-DQX, and a memory circuit 128 that contains data stored in the memory device 100.

The chip select signal CS/ at the pin 112 is a signal used to select one device, such as the memory device 100, out of several devices connected to the same bus. A low CS/ signal enables the command decoder 121 in the memory device 100, and a high CS/ disables the command decoder 121. All commands are masked from the memory device 100 when the CS/ signal is high, but READ/WRITE bursts already in progress will continue to completion, and a data mask (DQM) operation will retain its DQ mask capability while CS/ is high. Thus, the low CS/ signal enables a device connected to a bus to respond to commands and data on the bus while the high CS/ signal tells the device to ignore the bus. The signal CS/ provides for external bank selection on systems with multiple banks.

Address inputs at the pins A0-AX are captured on a falling edge of the row address strobe signal RAS/ at the pin 118, and a row corresponding to the address is opened. The row is held open as long as the row address strobe signal RAS/ is low.

Address inputs are captured on a falling edge of the column address strobe signal CAS/ at the pin 116, and a column corresponding to the captured address is selected from the currently open row for a read or write operation.

The write enable signal WE/ at the pin 114 determines whether a given falling edge of the column address strobe signal CAS/ initiates a read or a write operation. A high write enable signal WE/ directs a read operation, while a low write enable signal WE/ directs a write operation. If the write enable signal WE/ is low, data is captured at input pins on the falling edge of the column address strobe signal CAS/.

The signals WE/, CAS/, RAS/, and CS/ can, in various combinations, represent other commands not described above. For example, a high WE/ signal combined with low CKE, CAS/, RAS/, and CS/ signals represent a self-refresh command (SR) and a sleep mode of operation. The CKE signal may change to high to indicate an end of the SR command (and the sleep mode), and the beginning of an auto-refresh (AR) command. Therefore, high WE/ and CKE signals combined with low CAS/, RAS/, and CS/ signals represent the AR command.

The data-mask signal DM/ at the pin 120 controls input and output over the data bus 126 during read and write operations. The data bus 126 is activated to carry data to or from the memory device 100 if the data-mask signal DM/ is low, and data on the data bus 126 is masked from the memory device 100 if the data-mask signal DM/ is high.

The memory circuit 128 is coupled to the address bus 124 to receive information identifying a location for reading data to or writing data from the data bus 126. Management of read and write operations is performed by the control logic circuit 102 upon receiving the external command signals from the processor 101. The read and write operations of the memory device 100 are also controlled using a delay lock loop 130 having a CLK signal input to adjust timing provided to multiple drivers 132. Read and write operations are further controlled with a data strobe signal (DQS) that is generated by a DQS generator 134 coupled to the drivers 132. The DQS signal is placed on a DQS line 136. In addition, the drivers 132 put data received from the memory circuit 128 through a data buffer 138 on to the data bus 126.

The mode registers 122 have operating information that is programmed by a controller (not shown) on initialization or boot-up of a system including the memory device 100. This information includes a burst length that determines the maximum number of column locations that can be accessed for a given read or write command, and a burst type which is either sequential or interleaved. This information also includes a column address strobe signal CAS/ latency that is the number of clock cycles between the registration of a read command by the memory device 100 and the availability of the first bit of output data from the memory device 100. This information also includes an operating mode that is either a normal operation mode or a normal operation mode with a reset of the delay lock loop 130.

The memory device 100, as well as the mode registers 122 and the processor 101, can each be realized as a single integrated circuit. The memory device 100 can be formed on a semiconductor die using a substrate, where the substrate is a material such as silicon, germanium, silicon on sapphire, gallium arsenide, or other semiconductor material. The elements of the memory device 100 are fabricated using conventional processing, well-known to those of ordinary skill in the art, to form the various circuits within the semiconductor material and for providing electrical connections for coupling to an address bus, a data bus, and control lines for communication with a controller or a processor.

Figure 2:
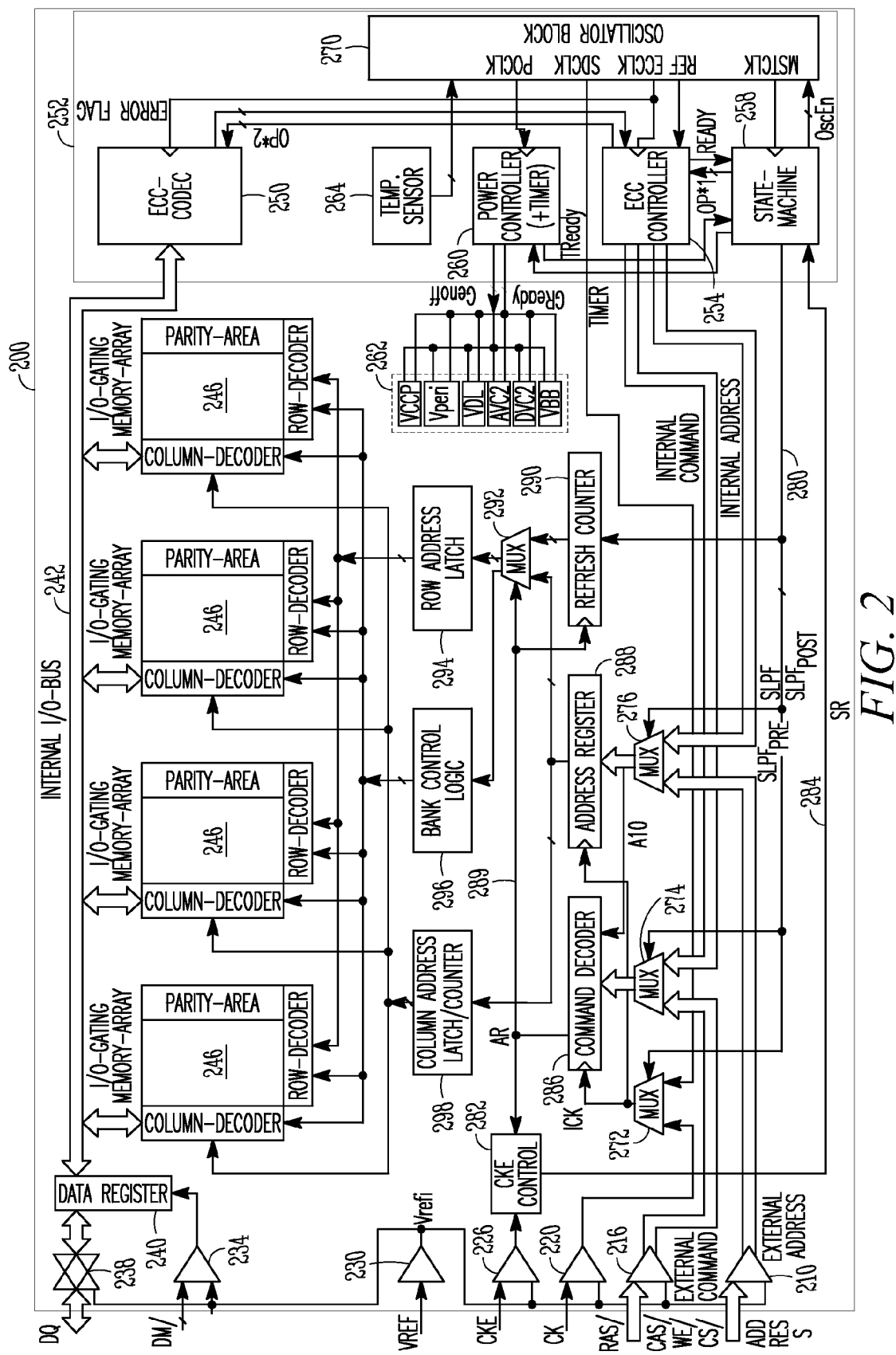
FIG. 2 is a block diagram of a memory device according to an embodiment of the invention.

FIG. 2 is a block diagram of a memory device 200 according to an embodiment of the invention. The memory device 200 may be similar to or identical to the memory device 100 of FIG. 1. According to some embodiments, the memory device 200 is a synchronous dynamic random access memory (SDRAM).

The processing of external command signals and address signals received in buffer circuits in the memory device 200 will now be described. External address signals are received in a buffer 210, external command signals RAS/, CAS/, WE/, and CS/ are received in a buffer 216, an external clock signal CK is received in a buffer 220, and a clock enable signal CKE is received in a buffer 226. A reference voltage VREF is received in a buffer 230, and a data mask signal DM/ is received in a buffer 234. Data signals DQ are exchanged across a two way buffer 238 coupled to a data register 240. The signal DM/ is coupled through the buffer 234 to the data register 240 to control the movement of data. An internal input/output (I/O) bus 242 exchanges data between the data register 240 and a number of arrays 246 of memory cells. Each array 246 includes a column decoder, a row decoder, and an array of memory cells to store data—including a parity area of memory cells. Data is also exchanged from the internal I/O bus 242 with an error correcting code (ECC) encoder/decoder circuit 250 in a control circuit block 252.

Control circuits in the control circuit block 252 control operations of the memory device 200 during a sleep mode of operation. An ECC controller 254 and a state machine 258 are also located in the control circuit block 252. A power controller 260 exchanges control signals with a plurality of internal voltage generators 262. A temperature sensor circuit 264 senses a temperature of the memory device 200 and provides a signal indicating the temperature to an oscillator block 270.

The oscillator block 270 generates clock signals that are coupled to the power controller 260, the ECC controller 254 and the state machine 258. The oscillator block 270 generates an internal clock signal SDCLK that is coupled to an input of a multiplexer 272, a second input of the multiplexer 272 is coupled to receive the external clock signal CK from the buffer 220. The multiplexer 272 generates an internal clock signal ICK to clock operations in the memory device 200. The internal clock signal ICK is derived from the external clock signal CK outside the sleep mode of operation, but is derived from the internal clock signal SDCLK during the sleep mode of operation.

The state machine 258 issues enable signals OscEn to enable the oscillator block 270. The oscillator block 270 generates an internal clock signal ECCLK that is coupled to the ECC controller 254 for decoding operations.

The external command signals RAS/, CAS/, WE/, and CS/ are coupled from the buffer 216 to an input of a multiplexer 274. A second input of the multiplexer 274 is coupled to receive internal command signals generated by the ECC controller 254. External address signals are coupled from the buffer 210 to an input of a multiplexer 276, and a second input of the multiplexer 276 is coupled to receive internal address signals from the ECC controller 254.

The state machine 258 generates several super low power flag signals SLPF, SLPFpre, and SLPFpost on lines 280 that are coupled to the multiplexers 272, 274 and 276 to control them during the sleep mode of operation. Super is a term of art and does not reflect a particular voltage level. The signals SLPF, SLPFpre, and SLPFpost are used to control the memory device 200 during the sleep mode of operation, and a potential timing relationship between the signals SLPF, SLPFpre, and SLPFpost will be described below with respect to FIG. 9. The oscillator block 270 also generates timing signals that are coupled to the power controller 260, the ECC controller 254, and the state machine 258. A clock enable CKE control circuit 282 is coupled to receive the clock enable signal CKE from the buffer 226, and generates a SR signal to indicate the SR command on a line 284 in response to the clock enable signal CKE. The SR signal on the line 284 is coupled to the state machine 258 that generates the signals SLPF, SLPFpre, and SLPFpost based on the SR signal.

The internal clock signal ICK is coupled from the multiplexer 272 to a command decoder 286 and an address register 288. The multiplexer 272 chooses the source of the internal clock signal ICK based on the signals SLPF, SLPFpre, and SLPFpost on the lines 280. The multiplexer 274 couples command signals to the command decoder 286, selecting either the external commands from the buffer 216 or the internal commands from the ECC controller 254 based on the signals SLPF, SLPFpre, and SLPFpost on the lines 280. The multiplexer 276 couples address signals to the address register 288, the address signals being either the external address signals from the buffer 210 or the internal address signals from the ECC controller 254 based on the signals SLPF, SLPFpre, and SLPFpost on the lines 280.

The command decoder 286 generates an auto refresh command (AR) signal on the line 289 depending on the commands that it receives, and the AR signal is coupled to the clock enable CKE control circuit 282, a refresh counter 290, and a multiplexer 292. The signals SLPF, SLPFpre, and SLPFpost on the lines 280 are also coupled to the refresh counter 290, which provides data to the multiplexer 292 that is in turn coupled to a row address latch 294, and a bank control logic circuit 296. The multiplexer 292 is coupled to receive address signals from the address register 288 which are also supplied to a column address latch and counter 298. The row address latch 294, the bank control logic circuit 296, and a column address latch and counter 298 are coupled to provide control signals to the arrays 246.

Figure 3:
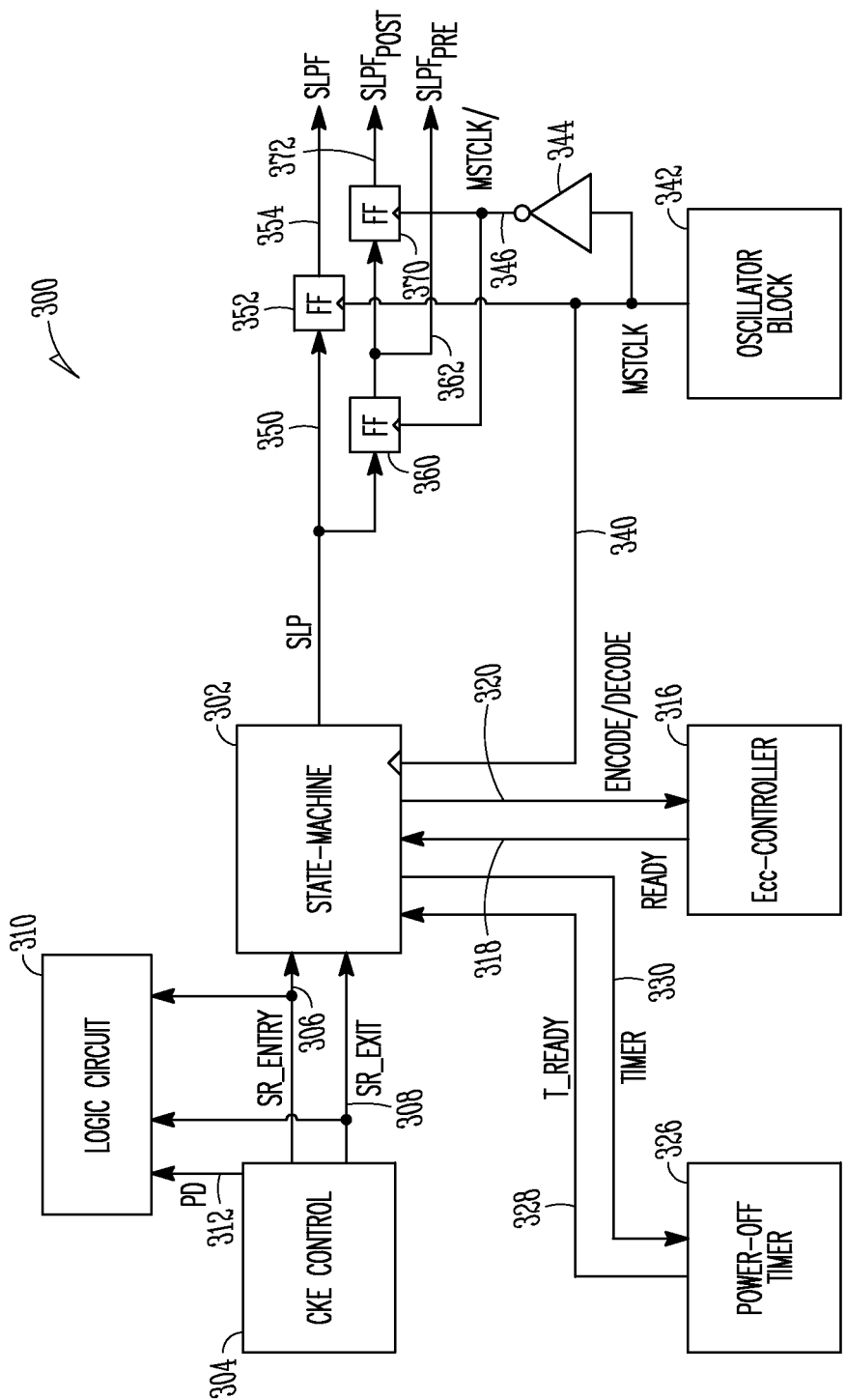
FIG. 3 is a block diagram of control circuits in a memory device according to an embodiment of the invention.

FIG. 3 is a block diagram of control circuits 300 in a memory device according to an embodiment of the invention. The control circuits 300 include a state machine 302 that controls the memory device during a sleep mode of operation, similar to the state machine 258 shown in FIG. 2.

Others of the control circuits 300 are similar to circuits having the same name in the memory device 200 shown in FIG. 2. For example, a clock enable CKE control circuit 304 generates a SR entry signal on a line 306 and a SR exit signal on a line 308 that are coupled to the state machine 302. The SR entry signal and the SR exit signal are also coupled to a logic circuit 310 as is a power-down signal PD on a line 312. The PD signal indicates a power-down mode of operation for the memory device when direct current (DC) power dissipation is reduced by, for example, disabling input buffers. An ECC controller 316 generates a READY signal on a line 318 that is coupled to the state machine 302, and the state machine 302 generates an Encode/Decode signal on a line 320 that is coupled to the ECC controller 316. The READY signal is generated by the ECC controller 316 when a decoding operation is complete. The logic circuit 310 generates control signals as will be described with reference to FIG. 4 below.

A power-off timer circuit 326 generates a T_READY signal on a line 328 coupled to the state machine 302, and the state machine 302 generates a TIMER signal on a line 330 that is coupled to the power-off timer circuit 326. The state machine 302 receives a clock signal MSTCLK on a line 340 that is generated by an oscillator block 342. The clock signal MSTCLK is inverted by an inverter 344 to generate a clock signal MSTCLK/ on a line 346. The clock signal MSTCLK is a basic clock signal that controls all states implemented by the state machine 302.

The state machine 302 generates a super low power signal SLP on a line 350 that is coupled through a first flip flop 352 timed by the clock signal MSTCLK to generate a SLPF signal on a line 354. The SLP signal on the line 350 is coupled through a second flip flop 360 timed by the clock signal MSTCLK/ to generate a SLPFpre signal on a line 362. The SLPFpre signal on the line 362 is coupled through a third flip flop 370 that is also timed by the clock signal MSTCLK/ to generate a SLPFpost signal on a line 372. The signals SLPF, SLPFpre, and SLPFpost are used to control the memory device during the sleep mode of operation, and a timing relation between the signals SLPF, SLPFpre, and SLPFpost will be described below with respect to FIG. 9.

Figure 4:
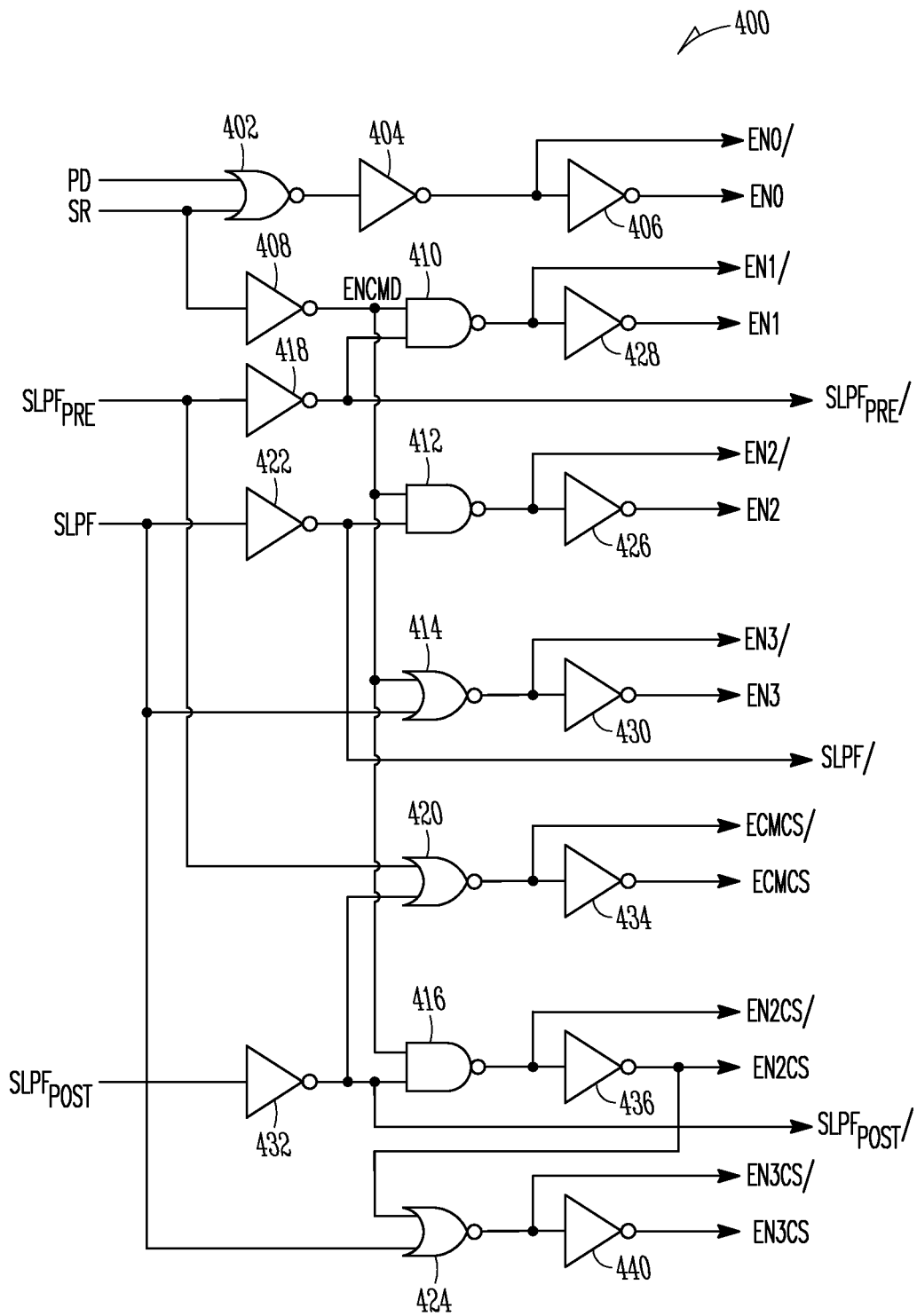
FIG. 4 is a block diagram of a logic circuit in a memory device according to an embodiment of the invention.

FIG. 4 is a block diagram of a logic circuit 400 in a memory device according to an embodiment of the invention. The logic circuit 400 is an embodiment of the logic circuit 310 shown in FIG. 3, and generates a variety of control signals based on the states of signals SLPFpre, SLPF, and SLPFpost.

The signals PD and SR are coupled to inputs of a NOR gate 402 and an output of the NOR gate 402 is coupled to an input of an inverter 404 to generate a control signal EN0/ that is coupled to an input of an inverter 406 to generate a control signal EN0. The signal SR is also coupled to an input of an inverter 408 to generate a signal ENCMD that is coupled to inputs of a NAND gate 410, a NAND gate 412, a NOR gate 414, and a NAND gate 416. The signal SLPFpre is coupled to an input of an inverter 418 to generate an inverted signal SLPFpre/ that is coupled to an input of the NAND gate 410. The signal SLPFpre is also coupled to an input of a NOR gate 420. The signal SLPF is coupled to an input of an inverter 422, a second input of the NOR gate 414, and an input of a NOR gate 424. The inverter 422 generates an inverted signal SLPF/ that is coupled to a second input of the NAND gate 412. An output of the NAND gate 412 generates a control signal EN2/ that is coupled to an input of an inverter 426 to generate a control signal EN2. The NAND gate 410 generates a control signal EN1/ that is coupled to an input of an inverter 428 to generate a control signal EN1. The NOR gate 414 generates a control signal EN3/ that is coupled to an input of an inverter 430 to generate a control signal EN3. The signal SLPFpost is coupled to an input of an inverter 432 to generate an inverted signal SLPFpost/ that is coupled to a second input of the NOR gate 420. The NOR gate 420 generates a control signal ECMCS/ that is coupled to an input of an inverter 434 to generate a control signal ECMCS. The inverted signal SLPFpost/ is also coupled to a second input of the NAND gate 416, the NAND gate 416 to generate a control signal EN2CS/ that is coupled to an input of an inverter 436 to generate a control signal EN2CS that is coupled to a second input of the NOR gate 424. The NOR gate 424 generates a control signal EN3CS/ that is coupled to an input of an inverter 440 to generate a control signal EN3CS.

The control signals generated by the logic circuit 400 shown in FIG. 4 are used to control the buffers and multiplexers in the memory device 200 shown in FIG. 2 during the sleep mode of operation.

Figure 5:
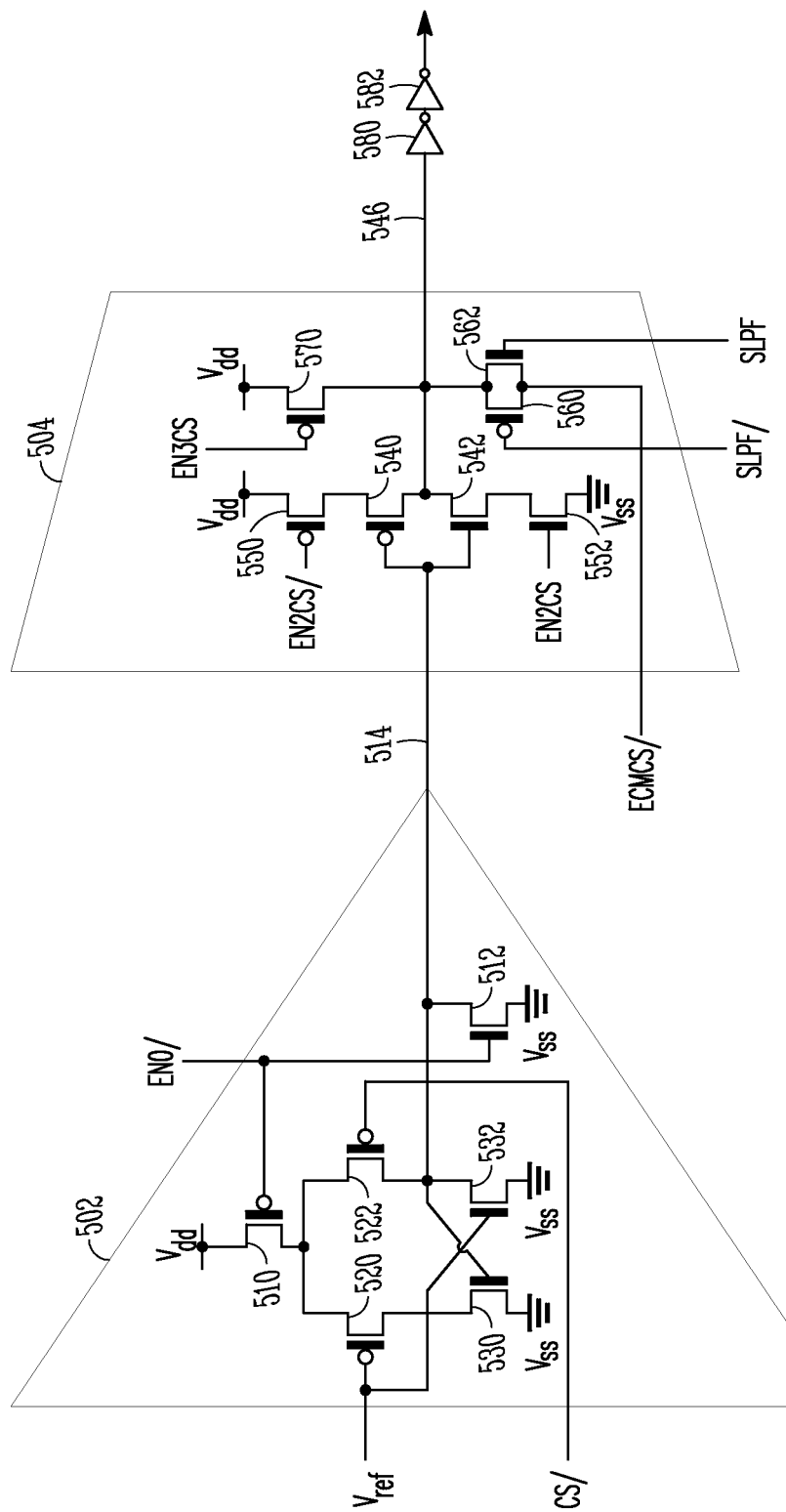
FIG. 5 is an electrical schematic diagram of a buffer circuit and a multiplexer in a memory device according to an embodiment of the invention.

FIG. 5 is an electrical schematic diagram of a buffer circuit 502 and a multiplexer 504 in a memory device according to an embodiment of the invention. The buffer circuit 502 and the multiplexer 504 are embodiments of the buffer circuits and multiplexers of the memory device 200 shown in FIG. 2.

Figure 6:
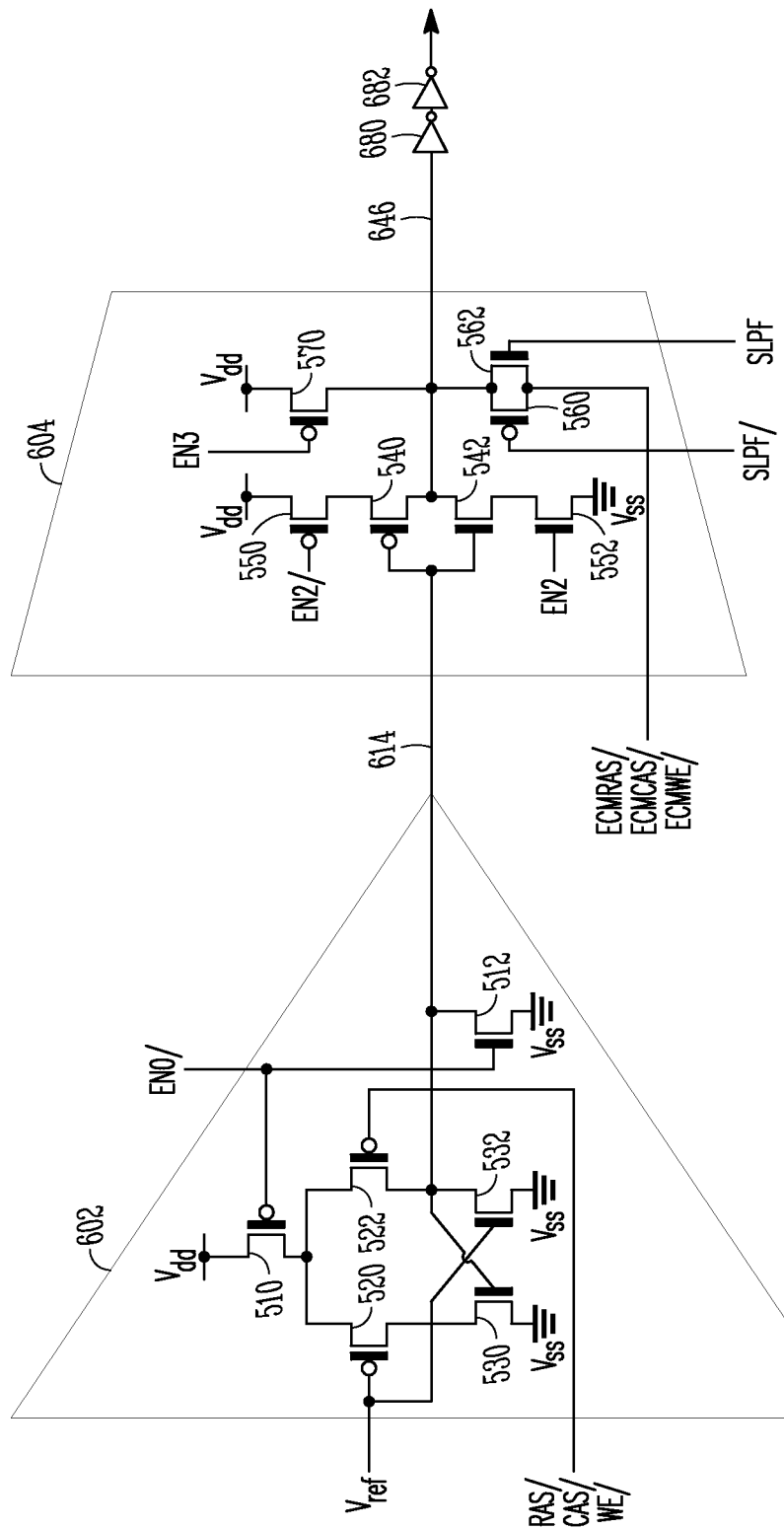
FIG. 6 is an electrical schematic diagram of a buffer circuit and a multiplexer in a memory device according to an embodiment of the invention.
Figure 7:
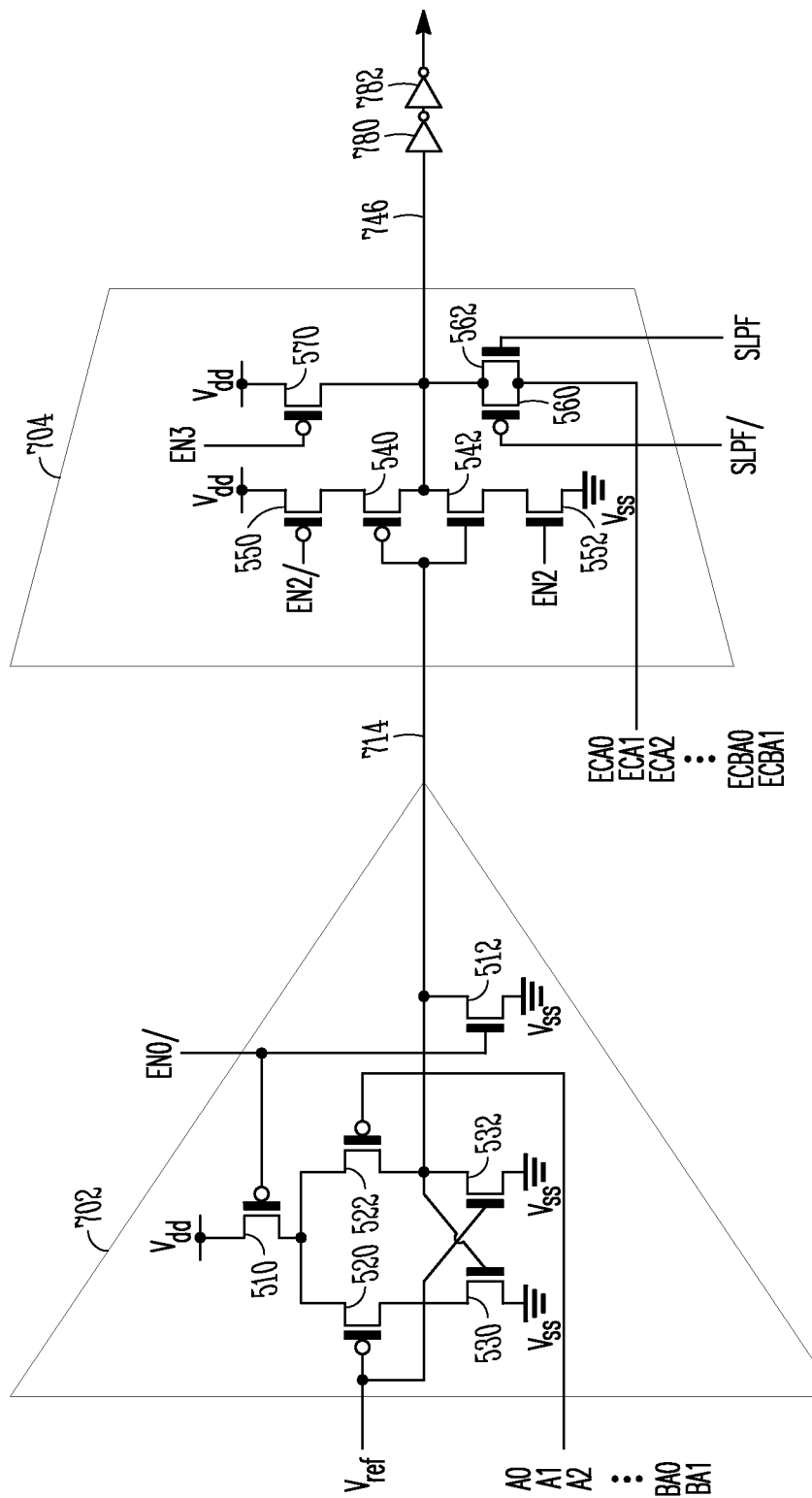
FIG. 7 is an electrical schematic diagram of a buffer circuit and a multiplexer in a memory device according to an embodiment of the invention.
Figure 8:
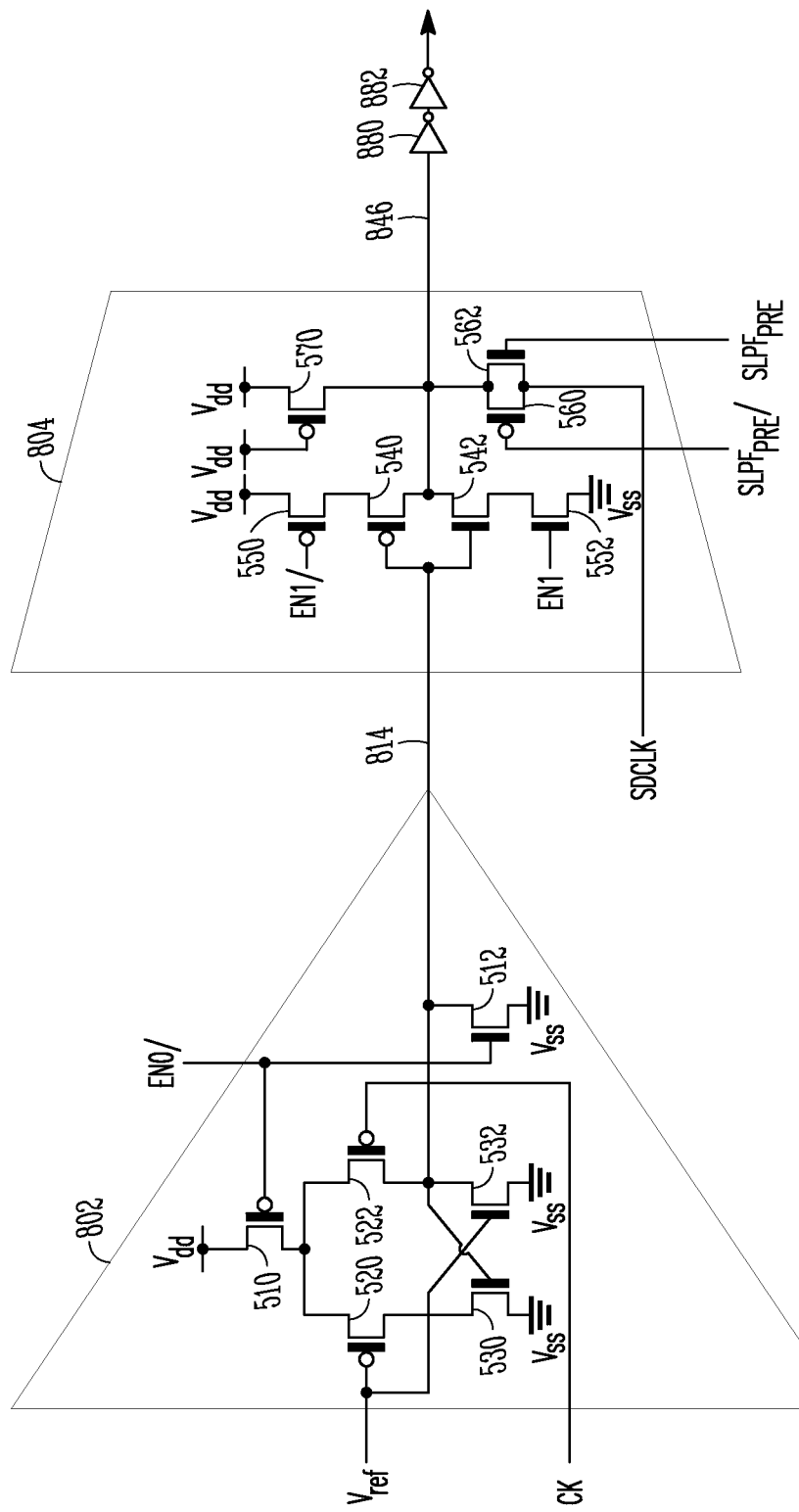
FIG. 8 is an electrical schematic diagram of a buffer circuit and a multiplexer in a memory device according to an embodiment of the invention.

The buffer circuit 502 and the multiplexer 504 include an arrangement of transistors that are the same as an arrangement of transistors in buffer circuits and multiplexers shown in FIGS. 6, 7 and 8. These transistors will be described with respect to FIG. 5; the corresponding transistors shown in FIGS. 6-8 will be given the same reference numerals and will not be further described herein for purposes of brevity.

The buffer circuit 502 includes a p-channel transistor 510 having a source coupled to a supply voltage Vdd and a drain. A gate of the p-channel transistor 510 is coupled to receive the signal EN0/ that is also coupled to a gate of an n-channel transistor 512, the n-channel transistor 512 having a drain coupled to an output line 514 and a source coupled to a ground voltage reference Vss. The p-channel transistor 510 and the n-channel transistor 512 enable the buffer circuit 502 to pass a signal to the multiplexer 504. The drain of the p-channel transistor 510 is coupled to a source of a p-channel transistor 520 and to a source of a p-channel transistor 522 that are coupled in parallel, a drain of the p-channel transistor 520 being coupled to a drain of an n-channel transistor 530 and a drain of the p-channel transistor 522 being coupled to a drain of an n-channel transistor 532. Sources of the n-channel transistors 530 and 532 are coupled to the ground voltage reference Vss. A voltage reference Vref is coupled to a gate of the p-channel transistor 520 and to a gate of the n-channel transistor 532. A gate of the n-channel transistor 530 is coupled to the drains of the n-channel transistors 532 and 512 and the output line 514.

An external signal is coupled to a gate of the p-channel transistor 522 such that the buffer circuit 502 generates the external signal on the output line 514. In FIG. 5, the buffer circuit 502 receives and then generates the external command signal CS/ on the output line 514.

The signal on the output line 514 is coupled to a gate of a p-channel transistor 540 and a gate of an n-channel transistor 542 in the multiplexer 504. The p-channel transistor 540 and the n-channel transistor 542 operate as an inverter to invert the signal on the output line 514 at an output on a line 546 connected to a drain of the p-channel transistor 540 and a drain of the n-channel transistor 542.

Operation of the multiplexer 504 is controlled by several of the control signals shown in FIG. 4. The control signal EN2CS/ is coupled to a gate of a p-channel transistor 550 having a source coupled to the supply voltage Vdd and a drain coupled to a source of the p-channel transistor 540. The control signal EN2CS is coupled to a gate of an n-channel transistor 552 having a drain coupled to a source of the n-channel transistor 542 and a source coupled to the ground voltage reference Vss. The control signals EN2CS/ and EN2CS thereby enable the inverter, including the transistors 540 and 542, to pass the signal on the output line 514 to the line 546 in inverted form. The control signals EN2CS/ and EN2CS can also disable the inverter including the transistors 540 and 542 such that an internal command signal ECMCS/ can be passed to the line 546 through a pass gate including a p-channel transistor 560 and an n-channel transistor 562. A source of the p-channel transistor 560 is coupled to a drain of the n-channel transistor 562, and a drain of the p-channel transistor 560 is coupled to a source of the n-channel transistor 562. A gate of the p-channel transistor 560 is coupled to receive the signal SLPF/ and a gate of the n-channel transistor 562 is coupled to receive the signal SLPF such that, during the sleep mode of operation, the internal command signal ECMCS/ is coupled through the transistors 560 and 562 to the line 546. A p-channel transistor 570 includes a source coupled to the supply voltage Vdd and a drain coupled to the line 546 and the transistors 560 and 562 to enable the transistors 560 and 562 to pass the internal command signal ECMCS/ to the line 546. The p-channel transistor 570 has a gate coupled to the control signal EN3CS. The signal on the line 546 is inverted twice, by first and second inverters 580 and 582, and then passed to a command decoder.

FIG. 6 is an electrical schematic diagram of a buffer circuit 602 and a multiplexer 604 in a memory device according to an embodiment of the invention. The buffer circuit 602 and the multiplexer 604 are embodiments of the buffer circuits and multiplexers of the memory device 200 shown in FIG. 2.

The buffer circuit 602 represents several buffer circuits that receive and then generate the external command signals RAS/, CAS/, and WE/ on an output line 614. The buffer circuit 602 is enabled by the control signal EN0/. The inverter including the transistors 540 and 542 in the multiplexer 604 is enabled by the control signals EN2/ and EN2, while the pass gate including the transistors 560 and 562 is enabled by the control signal EN3 and the signals SLPF/ and SLPF. The multiplexer 604 passes on the external command signals RAS/, CAS/, and WE/ to the line 646 when the inverter including the transistors 540 and 542 is enabled, and passes corresponding internal command signals ECMRAS/, ECMCAS/, and ECMWE/ to the line 646 when the pass gate including the transistors 560 and 562 is enabled. The signals on the line 646 are inverted twice, by first and second inverters 680 and 682, and then passed to a command decoder.

FIG. 7 is an electrical schematic diagram of a buffer circuit 702 and a multiplexer 704 in a memory device according to an embodiment of the invention. The buffer circuit 702 and the multiplexer 704 are embodiments of the buffer circuits and multiplexers of the memory device 200 shown in FIG. 2.

The buffer circuit 702 represents several buffer circuits that receive and then generate the external address signals A0, A1, A2 . . . BA0, BA1, . . . on an output line 714. The buffer circuit 702 is enabled by the control signal EN0/. The inverter including the transistors 540 and 542 in the multiplexer 704 is enabled by the control signals EN2/ and EN2, while the pass gate including the transistors 560 and 562 is enabled by the control signal EN3 and the signals SLPF/ and SLPF. The multiplexer 704 passes on the external address signals A0, A1, A2 . . . BA0, BA1, . . . to the line 746 when the inverter including the transistors 540 and 542 is enabled, and passes corresponding internal address signals ECA0, ECA1, ECA2 . . . ECBA0, ECBA1, . . . to the line 746 when the pass gate including the transistors 560 and 562 is enabled. The signals on the line 746 are inverted twice, by first and second inverters 780 and 782, and then passed to a command decoder.

FIG. 8 is an electrical schematic diagram of a buffer circuit 802 and a multiplexer 804 in a memory device according to an embodiment of the invention. The buffer circuit 802 and the multiplexer 804 are embodiments of the buffer circuits and multiplexers of the memory device 200 shown in FIG. 2.

The buffer circuit 802 receives and then generates the external clock signal CK on an output line 814. The buffer circuit 802 is enabled by the control signal EN0/. The inverter including the transistors 540 and 542 in the multiplexer 804 is enabled by the control signals EN1/ and EN1, while the pass gate including the transistors 560 and 562 is enabled by the signals SLPFpre/ and SLPFpre. The gate of the p-channel transistor 570 is coupled to the supply voltage Vdd. The multiplexer 804 passes on the external clock signal CK to the line 846 when the inverter including the transistors 540 and 542 is enabled, and passes a corresponding internal clock signal SDCLK to the line 846 when the pass gate including the transistors 560 and 562 is enabled. The signals on the line 846 are inverted twice by first and second inverters 880 and 882 and then are passed to other circuits in the memory device.

The control signals shown and described in FIGS. 5, 6, 7, and 8 are generated by the logic circuit 400 shown in FIG. 4 and described above. The corresponding internal command signals and internal address signals are generated by an ECC controller such as the ECC controller 254 shown in FIG. 2 during a sleep mode of operation. The corresponding internal clock signal SDCLK is generated by an oscillator block such as the oscillator block 270 shown in FIG. 2. The internal command signals are passed to a command decoder such as the command decoder 286 shown in FIG. 2.

Figure 9:
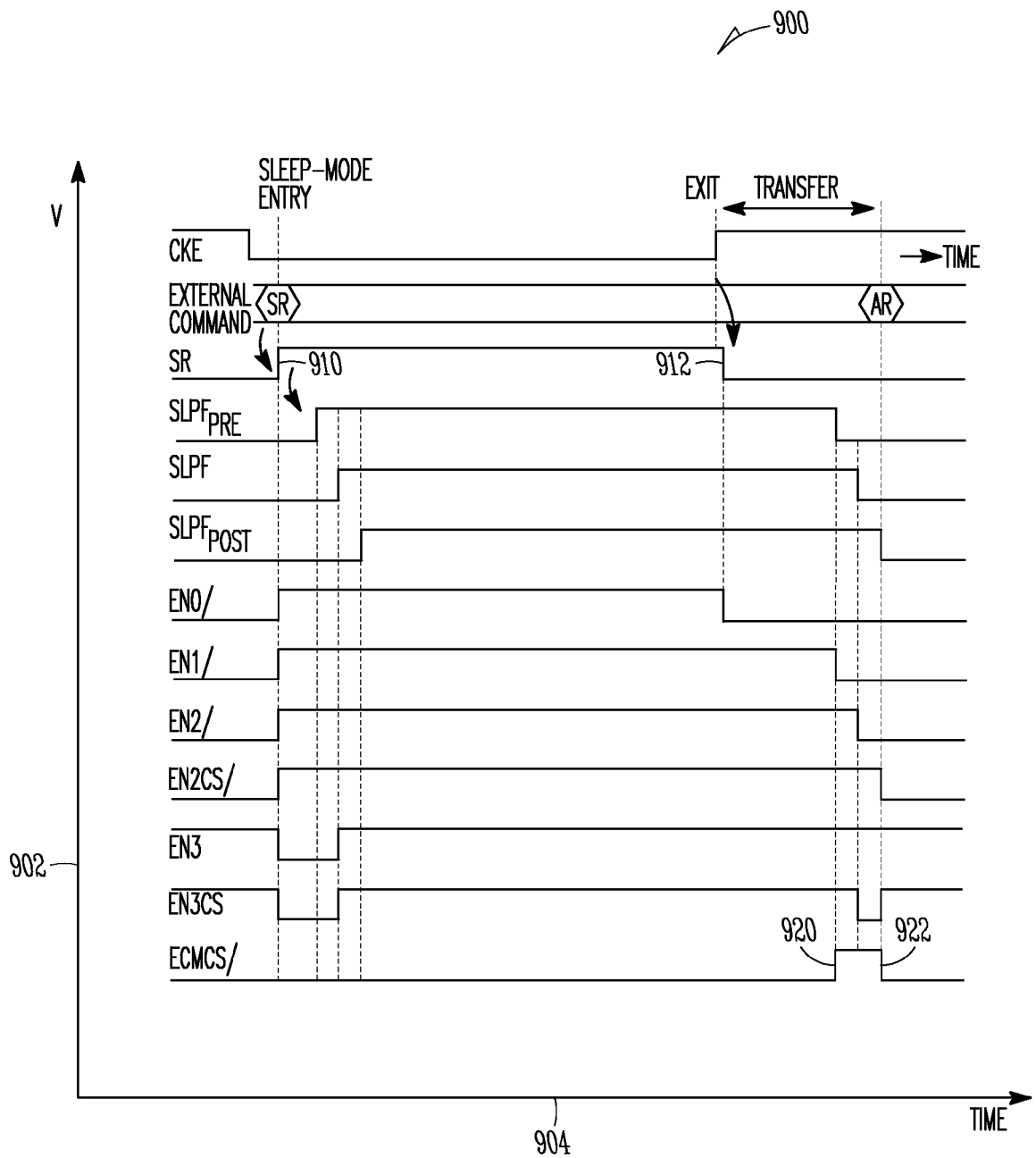
FIG. 9 is a timing chart of a memory device according to an embodiment of the invention.

FIG. 9 is a timing chart 900 of a memory device according to an embodiment of the invention. The timing chart 900 includes the signals SLPFpre, SLPF, and SLPFpost generated by the control circuits 300 shown in FIG. 3 and the state machine 258 shown in FIG. 2, and control signals generated by the logic circuit 400 shown in FIG. 4. The timing chart 900 also shows the clock enable signal CKE and external commands received by the memory device 200 shown in FIG. 2. In particular, the SR command, the AR command, and the SR signal are shown in the timing chart 900. The signals are shown with reference to voltage on a vertical axis 902, and with respect to time on a horizontal axis 904.

As described above, a high WE/ signal combined with low CKE, CAS/, RAS/, and CS/ signals represent the SR command and the beginning of a sleep mode of operation. The SR signal goes high on a rising edge 910 following a falling edge of the clock enable signal CKE to begin the sleep mode, and the SR signal goes low on a falling edge 912 following a rising edge of the clock enable signal CKE to indicate the end of the sleep mode. The rising edge of the clock enable signal CKE indicates the beginning of the AR command.

The signal SLPFpre leads the signal SLPF, while the signal SLPFpost lags the signal SLPF.

The signals in the timing chart 900 show in particular the activity of the internal chip select signal ECMCS/. With reference to FIG. 5, the control signal EN2CS/ disables the inverter while the signal SLPF enables the pass gate in the multiplexer 504 to pass the internal chip select signal ECMCS/ to the command decoder during the sleep mode of operation.

At the end of the sleep mode of operation, designated by the falling edge 912 of the SR signal, the memory device enters a transfer state over a transfer period TRANSFER when operation according to internal commands ends and operation according to external commands begins. The external command AR is received during the transfer period. The internal chip select signal ECMCS/ generated by the ECC controller is high for a short time between its rising edge 920 and its falling edge 922 and is coupled to the command decoder to disable the command decoder during the transfer period. In this way, commands will not be decoded and the execution of commands will be suspended while the command decoder is disabled. The possibility of command hazard events are therefore substantially reduced, because unexpected commands will not be decoded while the command decoder is disabled by the high internal chip select signal ECMCS/ during the transfer period.

Figure 10:
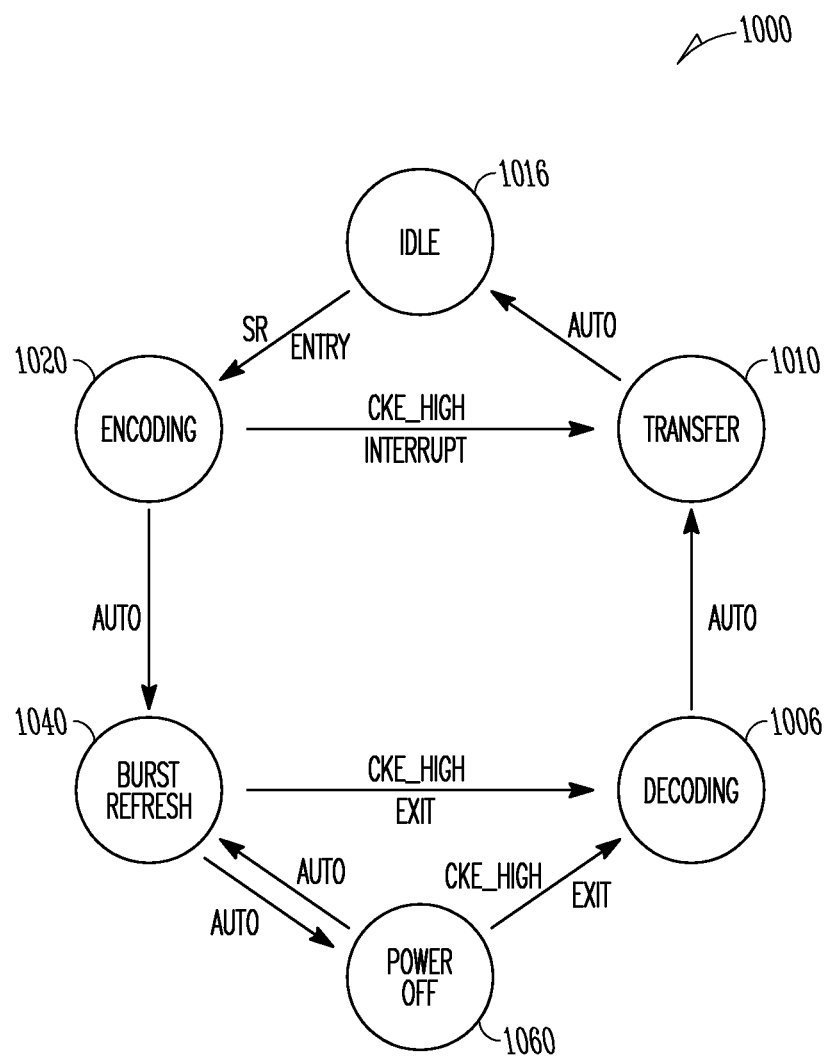
FIG. 10 is a state transition diagram of states in a sleep mode of a memory device according to an embodiment of the invention.

FIG. 10 is a state transition diagram 1000 of states in a sleep mode of a memory device according to an embodiment of the invention. Commands executing the transitions in the state transition diagram 1000 are generated by a state machine such as the state machine 258 shown in FIG. 2.

A decoding state 1006 occurs during system recovery when transitioning from battery power. In the decoding state 1006, syndrome patterns are calculated to detect errors in stored data and, if errors are found, the locations of the errors are detected and the erroneous data is corrected.

The state machine shifts to a transfer state 1010 responsive to the completion of the decoding state 1006. The transfer state 1010 includes the operations described with respect to the timing chart 900 of the memory device shown in FIG. 9. The transfer state occurs over a transfer time period bridging operation according to internal commands and operation according to external commands. The state machine shifts to an idle state 1016 responsive to the completion of the transfer state 1010. During the idle state 1016, the memory device operates according to external commands and an external clock signal.

The idle state 1016 ends upon the occurrence of the SR command when CKE is low, and the state machine shifts to an encoding state 1020. The ECC controller operates the memory device with internal commands and internal addresses and the ECC encoder/decoder circuit is controlled substantially simultaneously to calculate parity bits during the encoding state 1020. Parity bits or states are calculated and written to the arrays in the encoding state 1020. The encoding state 1020 can be interrupted by a high CKE signal in which case the state machine shifts to the transfer state 1010.

The state machine shifts to a burst refresh state 1040 responsive to the completion of the encoding state 1020 and CKE remains low. Data in the arrays is refreshed during the burst refresh state 1040. The state machine shifts back and forth between the burst refresh state 1040 and a power off state 1060 during the sleep mode when CKE is low. If CKE transitions to a high signal during either of the burst refresh state 1040 or the power off state 1060, the state machine shifts to the decoding state 1006 described above.

Embodiments of the invention described herein may be implemented with any electronic device that transfers between operation according to internal commands and operation according to external commands. The semiconductor device may comprise a processor or a memory device, such as an SDRAM memory or Flash memory.

Figure 11:
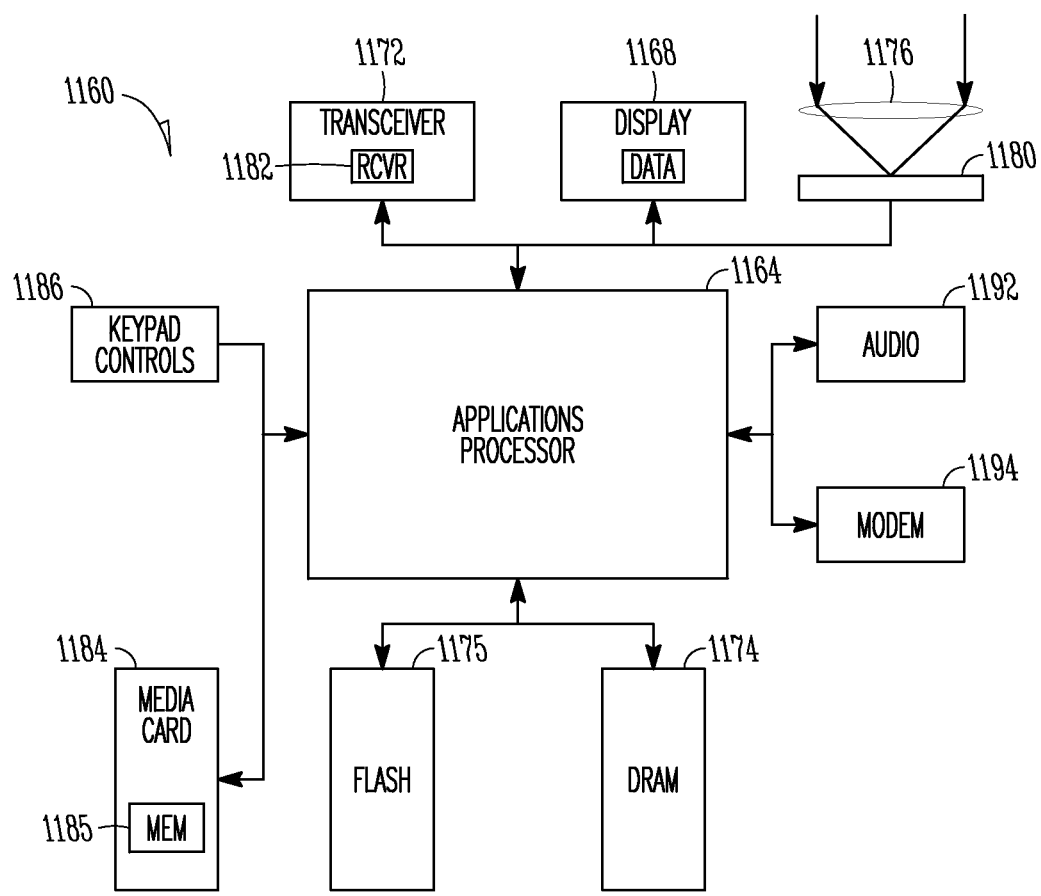
FIG. 11 is a block diagram of a system according to an embodiment of the invention.

FIG. 11 is a block diagram of a system 1160 according to an embodiment of the invention. The system 1160, in some embodiments, may include a processor 1164 coupled to a display 1168 and/or a wireless transceiver 1172. The display 1168 may be used to display data, perhaps received by the wireless transceiver 1172. The system 1160, in some embodiments, may include a memory device such as a dynamic random access memory (DRAM) 1174 and/or a Flash memory 1175. The processor 1164 is coupled to exchange data with the DRAM 1174 and the Flash memory 1175. The DRAM 1174 may be a synchronous DRAM (SDRAM).

In some embodiments, the system 1160 may include a camera including a lens 1176 and an imaging plane 1180 to couple to the processor 1164. The imaging plane 1180 may be used to receive light captured by the lens 1176.

Many variations are possible. For example, in some embodiments, the system 1160 may include a cellular telephone receiver 1182 forming a pinion of the wireless transceiver 1172. The cellular telephone receiver 1182 may also receive data to be processed by the processor 1164, and displayed on the display 1168. In some embodiments, the system 1160 may include an audio, video, or multi-media player 1184, including a memory device 1185 and a set of media playback controls 1186 to couple to the processor 1164. The processor 1164 may also be coupled to exchange data with an audio device 1192 and/or a modem 1194.

Any of the electronic components of the system 1160 may include circuits configured to transfer between operation according to internal commands and operation according to external commands according to embodiments of the invention described herein. In particular, the processor 1164 issues external commands to be received and processed by components such as the DRAM 1174, the Flash memory 1175, and the memory device 1185. One or more of the DRAM 1174, the Flash memory 1175, and the memory device 1185 include circuits configured to transfer between operation according to internal commands and operation according to external commands according to embodiments of the invention described herein.

Any of the circuits or systems described herein may be referred to as a module. A module may comprise a circuit and/or firmware according to embodiments of the invention.

Figure 12:
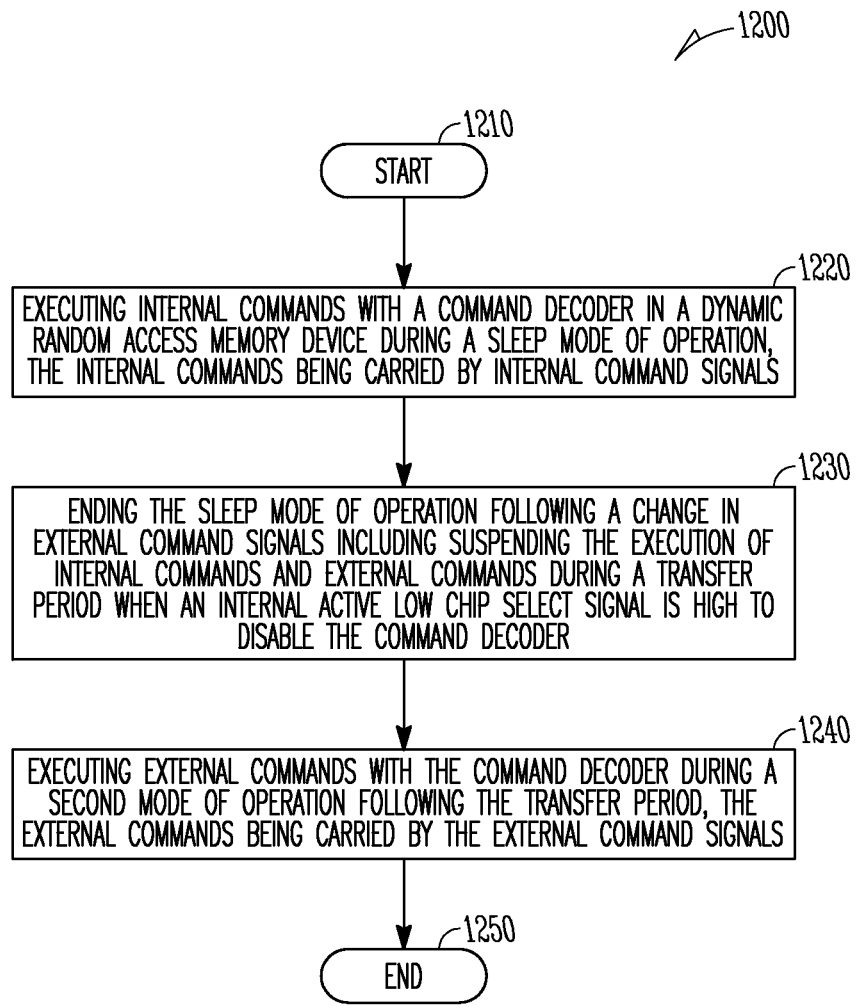
FIG. 12 is a flow diagram of several methods according to an embodiment of the invention.

FIG. 12 is a flow diagram of several methods 1200 according to an embodiment of the invention. In block 1210, the methods 1200 start.

In block 1220, internal commands are executed with a command decoder in a dynamic random access memory device during a sleep mode of operation, the internal commands being carried by internal command signals.

In block 1230, the sleep mode of operation is ended following a change in external command signals and the execution of internal commands and external commands is suspended during a transfer period when an internal active low chip select signal is high to disable the command decoder.

In block 1240, external commands are executed with the command decoder during a second mode of operation following the transfer period, the external commands being carried by the external command signals. In block 1250, the methods 1200 end.

The individual activities of methods 1200 may not have to be performed in the order shown or in any particular order. Some activities may be repeated, and others may occur only once. Embodiments of the invention may have more or fewer activities than those shown in FIG. 12.

The novel apparatus and systems of various embodiments may include and/or be included in electronic circuitry used in high-speed computers, communication and signal processing circuitry, single or multi-processor modules, single or multiple embedded processors, multi-core processors, data switches, and application-specific modules including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods, as described above.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method comprising:
    executing internal commands with a command decoder in an electronic device during a sleep mode of operation of the electronic device;
    receiving external command signals in the electronic device to indicate an end of the sleep mode of operation;
    disabling the command decoder with a signal generated by the electronic device in response to the external command signals during a transfer period between the first sleep mode of operation and a normal mode of operation of the electronic device; and
    executing external commands with the command decoder in the electronic device during the normal mode of operation of the electronic device following the transfer period.

2. The method of claim 1, wherein executing the commands with the command decoder in the electronic device during the sleep mode of operation further comprises:
    decoding internal command signals into internal commands in the command decoder in a memory device; and
    executing the internal commands during the sleep mode of operation of the memory device.

3. The method of claim 1, wherein executing external commands with the command decoder in the electronic device during the normal mode of operation further comprises:
    decoding the external command signals into the external commands in the command decoder in a memory device; and
    executing the external commands during the normal mode of operation of the memory device.

4. The method of claim 1, wherein disabling the command decoder includes disabling the command decoder when an internal chip select signal operates to disable the command decoder in the electronic device.

5. A method comprising:
    executing internal commands with a command decoder in an electronic device during a sleep mode of operation;
    generating an internal disable command in the electronic device;
    disabling the command decoder with the internal disable command during a transfer period between the sleep mode of operation and a normal mode of operation; and
    executing external commands with the command decoder in the electronic device during the normal mode of operation following the transfer period.

6. The method of claim 5, further comprising generating the internal commands in the electronic device.

7. The method of claim 6, wherein executing the internal commands includes executing the internal commands with the command decoder in the electronic device before the transfer period.

8. The method of claim 5, further comprising receiving the external commands in the electronic device.

9. The method of claim 8, wherein executing the external commands includes executing the external commands with the command decoder in the electronic device following the transfer period.

10. An apparatus comprising:
    a command decoder in an electronic device to decode and execute internal commands within the electronic device during a sleep mode of operation and to decode and execute external commands during a normal mode of operation; and a controller in the electronic device to generate a disable command to disable the command decoder during a transfer period between the sleep mode of operation and the normal mode of operation.

11. The apparatus of claim 10, wherein the controller is structured to generate the internal commands executed by the command decoder during the sleep mode of operation.

12. The apparatus of claim 11, wherein the controller comprises an error correcting code controller circuit to generate internal command signals during the sleep mode of operation, the command decoder to decode the internal command signals into the internal commands.

13. The apparatus of claim 10, further comprising a circuit in the electronic device to generate an internal chip select signal to disable the command decoder during the transfer period.

14. An apparatus comprising:

an array of memory cells in a memory device;

a command decoder in the memory device to decode and execute internal commands during a sleep mode of operation and to decode and execute external commands during a normal mode of operation with respect to the memory cells in the array; and a controller in the memory device, the controller structured to generate a disable command to disable the command decoder during a transfer period between the sleep mode of operation and the normal mode of operation.

15. The apparatus of claim 14, wherein the controller is coupled to the command decoder to generate a chip select signal during the transfer period to disable the command decoder.

16. The apparatus of claim 14, wherein the controller comprises an error correcting code controller circuit coupled to generate internal command signals during the sleep mode of operation.

17. The apparatus of claim 14, further comprising a state machine in the memory device to generate control signals to control operations of the memory device during the sleep mode of operation.

18. A method comprising:

generating internal commands in an electronic device during a sleep mode of operation;

executing the internal commands with a command decoder in the electronic device during the sleep mode of operation of the electronic device;

receiving external commands in the electronic device during a normal mode of operation;

executing the external commands with the command decoder during the normal mode of operation of the electronic device; and disabling the command decoder in the electronic device when changing between the sleep mode of operation and the normal mode of operation of the electronic device.

19. The method of claim 18, wherein disabling the command decoder further comprises suspending execution of the internal commands in the electronic device between an end of the sleep mode of operation and a beginning of the normal mode of operation.

20. The method of claim 19, wherein the electronic device comprises a memory device.

* * * * *

UNITED STATES PATENT AND TRADEMARK OFFICE
CERTIFICATE OF CORRECTION

Page 1 of 1

PATENT NO.        : 8,572,292 B2
APPLICATION NO.   : 13/213997
DATED             : October 29, 2013
INVENTOR(S)       : Yutaka Ito et al.

It is certified that error appears in the above-identified patent and that said Letters Patent is hereby corrected as shown below:

In the Claims:

In column 12, line 16, in Claim 1, after "between the" delete "first".

Signed and Sealed this
Twenty-eighth Day of January, 2014

Michelle K. Lee
*Deputy Director of the United States Patent and Trademark Office*